United States Patent Office 3,492,394
Patented Jan. 27, 1970

3,492,394
MOLDING CAPABLE OF PROVIDING MULTIPLE RELEASE OF ARTICLES THEREFROM AND OF USING SAME
Richard F. Heine, White Bear Lake, Minn., assignor to Minnesota Mining and Manufacturing Company, St. Paul, Minn., a corporation of Delaware
No Drawing. Filed Oct. 3, 1966, Ser. No. 583,970
Int. Cl. B29c 1/04
U.S. Cl. 264—297          5 Claims

ABSTRACT OF THE DISCLOSURE

A mold and a method of molding foamed urethane compositions are disclosed wherein the molds are provided with a tenaciously adherent coating of fluorine-containing silane derivatives which provide durable release coatings on the mold surfaces capable of providing multiple release of articles therefrom to allow repeated use of the mold without additional treatment.

---

The present invention relates to a novel molding technique. In one aspect, the invention relates to metal molds for foamed urethane compositions which have been treated with a fluorochemical mold release composition.

The preparation of castings and moldings from natural or synthetic resins has developed over many years and is now an established art. One of the problems encountered by the art had been that of removing the formed article from the mold upon completion of the molding or casting step. The molding or casting operation involves the confining, either in an open or closed mold, of a normally liquid or molten material which, during the molding process, is converted to a solid resin. The liquid was a tendency to wet the confining surfaces of the mold, and, after solidification, is firmly adhered to the surface.

The industry has expended considerable time and energy in the development of materials to facilitate the release of the molded resin from the mold. In general, each molding composition has required a special release material or agent; oftentimes a different release agent was required where the mold material varied. In many cases, hydrocarbon waxes, in the form of low melting solids, dispersions or solutions, which were applied to the mold surfaces by wiping or spraying, have proved quite satisfactory if the wax is sufficiently insoluble in the molding or casting composition that the formed article would not adhere well to the wax surface.

More recently, synthetic polymers have been found to be more efficacious as mold release agents since their solubility in the molding composition is generally much lower than the waxes. These synthetic polymer release agents thus resulted in a mold surface which would be effective to release the molded article from the mold for several molding cycles before requiring replenishing.

Among the synthetic polymer release agents, the hydrocarbon-substituted silicon derivatives have been particularly effective. They have been applied to the mold surface as vapors in the case of the low molecular weight volatile methyl silanes or as liquids or waxy solids in the case of the polysiloxanes to form a release coating on the mold. The silanes used were either mono-, di- or tri-functional, i.e., containing 1, 2 or 3 readily hydrolyzable groups such as halogen or alkoxy attached to the silicon atom. These hydrolyzable groups react either with free moisture in the air or on the mold surface, or with hydroxyl groups which form a part of the mold surface such as with glass. The mono-functional materials, with a single point of adhesion to the surface, are generally readily removed by the liquid molding composition and have proven to be of little value. The di- and tri-functional materials, on the other hand, form a polymeric network and have proven to be more permanent. The liquid or waxy polysiloxanes, which are obtained by hydrolysis of a predominately di-functional silane to a relatively non-volatile oil or wax which is readily soluble in selected solvents, form a useful coating having very good release characteristics on the mold surface when applied from solution or by wiping on. These polysiloxane coatings, however, are still sufficiently soluble in the molding composition so that they must be reapplied after one or a relatively few molding cycles. The polysiloxanes made by hydrolysis of the tri-functional silanes as contrasted to the commonly used di-functional silanes, are generally insoluble; as a result, they are difficult to apply and, accordingly, have not found wide application.

Very low solubility in the molding composition resulting in permanence of the coating, and incompatibility with the liquid molding composition which assures not-wetting of the mold surface are essential properties of a good release agent. This incompatibility characteristic of the release agents has been achieved by the use of perfluoroalkyl-containing silicon derivatives, which are excellent release agents in general for hydrocarbon-based molding materials. Also, their very fluorocarbon nature makes them of low solubility to provide multiple release coatings. It is obvious that a more economical operation results when a mold can be used for a number of cycles before reapplication of a release agent thereto; this is due not only in the obvious savings in release material but also in the significant savings of time and labor. This is particularly true in a continuous operation where a number of molds are being used in a repeating cycle of filling, curing and emptying.

The technique of molding objects from polymeric foams has recently become commercially important in the production of such articles as shock absorbent paddings, furniture seat and padding materials, automotive seats, cushions, etc. These articles have customarily been made by a two-stage reaction process by first forming a prepolymer and subsequently "finishing off" the polymerization process usually in the presence of water. A compound which decomposes or volatilizes during the mold cycle to form a gas is incorporated in the prepolymer mixture; during the curing stage, the liberated gases provide a foam structure which cures to a stable three-dimensional solid cellular product. These prepolymers, because of their relatively high molecular weights, are poor solvents for many release agents and consequently have caused few release problems.

Most recently, the cellular plastics art has perfected the so-called "one-shot urethane foams." These "one-shot foams" are produced by reacting a mixture of hydroxyl-terminated compounds and isocyanate-terminated compounds with a catalyst for establishing a reasonable rate of reaction, surface active agents to provide satisfactory foam structure and a low molecular weight volatile material, commonly a chloro-fluorocarbon such as $CHClF_2$ or $CCl_3F$, to provide the gaseous phase of the foam. In order to obtain a polymer with satisfactory physical strength and compression resistance, the hydroxyl-terminated material must be of low molecular weight and the isocyanate-terminated compounds must be used in high concentrations. However, both of these classes of compounds as well as the chlorofluorocarbon are excellent solvents for a wide variety of materials and consequently most of the commonly used release agents were dissolved in the reaction mixture and were virtually useless as release agents. Of those release agents that are relatively insoluble, all previously known were sufficiently wetted by the reaction mixture so that poor, if any, release was obtained and in no case was it possible to get an economically desirable number of multiple releases of the molded article.

Accordingly, entirely new mold release agents were required for molding the "one-shot urethane foam" products. Among the formerly reliable release agents were the high melting waxes such as carnauba wax, fluorocarbon and silicone coatings and vacuum formed fluorocarbon sheet mold liners. Except for the formed sheet liner, these are all easily scratched and must then be completely stripped off and replaced. Moreover, the liners interfere with the heat transfer characteristics of the mold and, because they require such extensive mold surface preparation and curing conditions, their use is precluded for economic reasons. It has, therefore, been customary to utilize a single-cycle release agent and to renew the release agent at the commencement of each cycle. It is, therefore, much to be desired to provide a mold release agent which can be applied to a mold surface and which will be effective for several cycles.

An object of this invention is to provide a new molding process for curable liquids.

Another object of this invention is to provide a mold release agent for applying a durable treatment to a mold surface.

Another object of this invention is to provide a convenient and simple method for treating a mold surface to provide multiple release of the molded article.

Still another object of this invention is to provide a treated mold which possesses multiple release characteristics.

These and other objects and advantages will become apparent to those skilled in the art from the accompanying description.

It has now been found that a special class of fluorine-containing silane derivatives can be used to provide durable release coatings on mold surfaces capable of providing multiple release of articles therefrom. This is particularly valuable for use with curable liquid mixtures which are aggressive solvents for the commonly used release agents. An example of such a mixture is the composition previously referred to as the "one-shot urethane foam." According to this invention the inner surface of a mold is coated with a tri-functional (hydrolyzable) silane having a fluorinated monovalent aliphatic terminal radical of at least two carbon atoms in which carbon is substituted only by F, H and Cl atoms, said radical containing a perfluoromethyl group and having not more than one substituent atom other than F for every carbon atom in excess of two and each carbon atom bearing at least one fluorine atom. The silane is applied to the mold surface by being sprayed, brushed or wiped thereon, usually in the form of a dilute solution or suspension and insolubilized to form a durable release coating. For both economic reasons and for best results in conveniently treating a mold surface to render it durably releasable, the organic solution or suspension contains a maximum of about 15% fluorochemical compound, preferably less than 10% and in most instances 1 to 6% by weight. Preferred silane compounds of the present invention are represented by the formula $R_fQ_pSiX_3$ where $R_f$ is a fluorine-containing monovalent aliphatic radical and contains from 2 to about 18 or more carbon atoms and should have at least one terminal $CF_3$ group in order to provide a release surface. At least two carbon atoms are necessary in the fluorinated radical to provide sufficient insolubility, preferably at least four carbon atoms. While compounds containing up to 18 carbon atoms in the radical can be commercially obtained, there is no observable advantage obtained with compounds containing more than about 12 carbon atoms in the fluorinated radical. Accordingly, the preferred compounds are those wherein the fluorinated radical contains about 4-12 carbon atoms. While a perfluoroalkyl terminal group is preferred, efficient operation can be obtained where a small fraction, e.g., less than about 25% of the fluorine atoms of a perfluoroalkyl group have been replaced by atoms of H or Cl, provided that a $CF_3$ terminal group is present in the radical. The term "aliphatic radical" as used herein includes alicyclic radicals as well as radicals containing a carbon linking heteroatom in the skeletal chain such as oxygen or nitrogen. Inclusion of an oxygen atom linking two fluorinated carbon atoms or a nitrogen atom linking three fluorinated carbon atoms does not materially alter the properties of the aliphatic radical. Straight chain structures are generally preferred, although alicyclic rings or branched chain structures are also effective. Mixtures of various structures or chain lengths are commonly used since they are more readily commercially available and generally tend to provide improved release properties over the pure compounds.

$Q_p$ of the formula represents a divalent linking radical such as $-SO_2N(R)(C_mH_{2m})-$ or $$-CON(R)(C_mH_{2m})-$$

in which R is hydrogen or a lower alkyl radical containing 1 to 4 carbon atoms and $m$ is 1 to 11; or $-(C_nH_{2n})-$ wherein $n$ is 1 to 11; or $-CH_2CHCl(C_yH_{2y})-$ whereby $y$ is 0 to 9. The Q moiety comprises those groups which are readily available to connect the $R_f$ radical to the silicon atom. However, $p$ may be 0 to 1, i.e., the $R_f$ radical may be directly linked to the silicon atom. Its structure and composition, so long as it is free of groups which are readily reactive with either a hydroxyl radical or an isocyanate radical, has only a secondary influence on the effectiveness of the compound as a release agent. In order to obtain the desired low solubility of the final product, the alkylene component, i.e., the subscripts $n$, $m$ or $y$, is desirably less than half the number of carbon atoms in the radical $R_f$, particularly where $R_f$ contains less than about 6 carbon atoms; where the fluorinated radical $R_f$ contains more than 8 carbon atoms, the alkylene component of the Q moiety is not critical.

X of the formula represents a hydrolyzable radical such as Cl, Br, H or OR′, where R′ is a lower alkyl radical containing 1–4 carbon atoms. It is particularly important to have three hydrolyzable groups attached to the silicon atom since it has been found, as above noted, that the mono- and di-functional silanes are materials which release either not at all or provide an unsatisfactorily low number of releases. This is apparently due to the solubility of the reacted product; mono-functional compounds can link only once to the mold surface; di-functional compounds can, at best, provide linear polymers which are inherently soluble. In contrast, the tri-functional compounds ultimately form three-dimensional cross-linked polymers which are substantially insoluble in the molding material and are, therefore, both effective release agents and form durable films. Although the exact mechanism for forming the cured insoluble polymeric release coatings is not known, it is presumed that the hydrolyzable groups react with water from the formulation or with hydroxyl groups on the mold surface or with adventitious moisture on the mold surface or in the atmosphere resulting in the formation of stable Si—O linking. While not necessary, it is usually convenient to have each of the hydrolyzable radicals be identical, i.e., although a mixture of Cl and $OCH_3$ radicals will function effectively, the trichloro or trimethoxy derivatives are more readily available and, therefore, preferred.

Typical examples of fluorochemical compounds which fulfill the requirements of the present treating composition include:

$C_4F_9(CH_2)_2Si(OCH_3)_3$
$(CF_3)_2(CF_2)_6CH_2CHCl(CH_2)_2SiCl_3$
$C_8F_{17}SO_2N(CH_3)(CH_2)_2SiBr_3$
$C_8F_{17}SO_2N(C_2H_5)CH_2CH_2CH_2SiCl_3$
$C_8F_{17}CH_2CHClSiCl_3$
$C_8F_{17}SO_2N(CH_2CH_2CH_2SiCl_3)_2$
$C_8F_{17}SO_2N(C_2H_5)CHI_2CH_2CH_2Si(OCH_3)_3$
$C_8F_{17}CH_2CHClSiHCl_2$
$CF_3(CFCl_2)CF(CF_2)_{10}CON(C_2H_5)(CH_2)_3Si(OC_2H_5)_3$

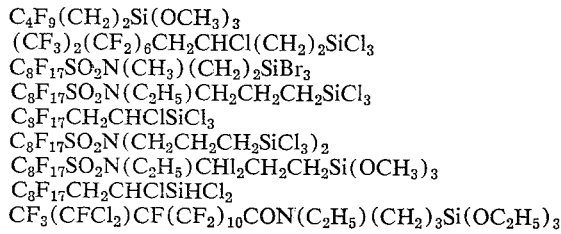

$C_{12}F_{25}CH_2CHClSi(OCH_3)_3$
$C_2F_5C_6F_{10}SO_2N(CH_3)(CH_2)_3SiCl_3$
$C_{11}F_{23}CON(C_3H_7)(CH_2)_3SiCl_3$

The fluorochemical compounds of the present invention may be prepared by a variety of well known procedures; see, for example, U.S. Patent Nos. 2,651,651, 3,012,006, Netherlands application 6511871 and Organo Silicon Compounds, vol. I, Bazant et al., Academic Press, New York, 1965, esp. p. 139 et seq.

As previously noted, the treating composition of the present invention is applied to a mold surface by being sprayed, brushed or wiped thereon, usually in the form of a dilute solution or suspension. The mold may be constructed of any of the conventional mold materials such as metal, ceramic, wood or plastic. Aluminum is a preferred mold material due to its heat conducting characteristics and its lightness and strength. The mold may, of course, be either an open or closed mold.

A variety of solvents may be used, provided that the solvent is one that will dissolve the fluorochemical compound is reasonably volatile so as not to require extensive drying and will not deleteriously affect the mold surface. Examples of such solvents are the chlorinated hydrocarbons, chloro-fluorinated hydrocarbons, ketones and ethers. In addition, aqueous dispersions may be prepared from either the chloro or alkoxy silanes which are suitable for application to the mold. Water is desirable because of its ready availability and also due to its non-flammable and non-toxic character. It has been found, however, that these aqueous dispersons have limited shelf-lives and must, therefore, be used within a short time of their preparation. For these uses, the silanes would ordinarily be supplied in the form of a concentrated emulsifiable solution which would be diluted with a sufficient amount of an aqueous solution.

The following examples are offered as an aid to a better understanding of the present invention and are not to be construed as unnecessarily limiting to the present invention.

EXAMPLE 1

A treating composition was prepared by dissolving a fluorocarbon trichlorosilane having the formula $C_8F_{17}SO_2N(C_2H_5)CH_2CH_2CH_2SiCl_3$ in a trichlorotrifluoroethane solvent ($C_2Cl_3F_3$-Freon-113) to yield a solution containing 5 weight percent of the fluorocarbon trichlorosilane. This solution was sprayed onto a thoroughly cleaned open aluminum mold so that the entire interior surface of the mold was completely covered. The mold was then air dried and heated at a temperature of 130° C. for 10 minutes resulting in a three-dimensional cross-linked polymeric coating tenaciously bonded to the mold surface.

A urethane foam composition was prepared from the following ingredients in two parts.

Part A

| | Parts |
|---|---|
| Polyoxypropylene glycol m.w. 2000 (PPG 2025) | 30 |
| Ethylene oxide capped polyoxyproplene triol, m.w. 3000 (Niax L–56) | 70 |
| Silicone foam structure modifier—Union Carbide Y–4962 | 4 |
| Tartaric acid | 0.1 |
| Dibutyl tin dilaurate catalyst | 0.4 |
| Triethylenediamine catalyst (33% in water) | 1.5 |
| Water | 4 |
| Trichloromonofluoromethane (Freon–11) | 10 |

Part B

| | |
|---|---|
| Toluene diisocyanate | 48 |

The Part A ingredients were premixed and then combined with Part B with rapid stirring. The mixture was poured into the previously coated mold in about 15 to 30 seconds or as soon as foaming became evident. The foam was baked at about 160° C. for 20 minutes. The cured foam was removed from the mold in one piece, with skin intact, by merely peeling it from the mold.

Eight identical molding cycles were subsequently run in the same mold; there was no evidence of deterioration in release properties after the nine castings.

In contrast, use of solutions containing structurally similar compounds, when applied to mold surfaces under identical conditions, resulted in molds which either released only once or not at all. The compounds tested in this manner and their release characteristics were:

| Compound | Number of Releases |
|---|---|
| $(CH_3)_2SiCl_2$ | 1 |
| Cyclohexenylethyl trichlorosilane | 1 |
|  | 1 |
| $Poly[Cr(OH)_3 \cdot 2C_7F_{15}CO_2H]$ | 1 |
| $Poly[C_8F_{17}SO_2N(C_2H_5)CH_2CH_2O\overset{O}{\underset{\|}{C}}CH{=}CH_2]$ | 1 |
| $C_8F_{17}SO_2N(C_2H_5)CH_2CH_2CH_2Si(CH_3)Cl_2$ | 0 |
| $C_{18}H_{37}SiCl_3$ | 0 |
| $Poly[C_8F_{17}CH_2CHClSi(CH_3)O]$ | 0 |
| $[C_8F_{17}SO_2N(C_2H_5)CH_2CH_2O]_3P{=}O$ | 0 |

EXAMPLE 2

Perfluorooctane sulfonyl chloride, $C_8F_{17}SO_2Cl$, was prepared according to the teachings of U.S. Patent No. 2,732,398. A mixture of 500 grams (1.0 mole) of perfluorooctane sulfonyl chloride, 250 grams (1.5 mole) of vinyl trichlorosilane and 3.5 grams of azobisisobutyronitrile was stirred and heated in an oil bath to 79° C. over an hour's time. Evolution of gas began at about 75° C. and the reaction became exothermic at 79° C. and rose to a temperature of 100° C. in twenty minutes. During this time, the bath temperature was maintained at 80° C. After the exotherm subsided, the bath was raised to 100° C. The reaction mixture was then distilled to recover a $C_8F_{17}CH_2CHClSiCl_3$ product.

A treating composition was prepared by dissolving the fluorocarbon trichlorosilane having the formula $C_8F_{17}CH_2CHClSiCl_3$ in Freon-113 to give a solution containing 10 weight percent of the fluorocarbon silane and applied to an open aluminum mold and insolubilized on the mold surface as in Example 1.

Following the molding procedure set forth in Example 1, this mold release agent also released the formed urethane foam for nine cycles without any evident deterioration in release properties.

EXAMPLE 3

A one weight percent solution was prepared by dissolving the fluorocarbon trichlorosilane of Example 1 in Freon–113. This solution when applied to an open aluminum mold, formed a cross-linked polymeric coating which also exhibited excellent multiple release properties.

EXAMPLE 4

A fluorocarbon trialkoxysilane having the formula $C_8F_{17}SO_2N(C_2H_5)CH_2CH_2CH_2Si(OCH_3)_3$ was added to sufficient aqueous 1% acetic acid to yield an aqueous dispersion containing 5 weight percent of the alkoxy silane. This mold release agent was sprayed onto an aluminum mold previously heated to 130° C. Drying and curing of the polymeric coating took place almost immediately; the foam composition was poured into the mold when the mold temperature reached 100° C., part of the cooling being effected by evaporation of the water in the treating composition.

Castings of the foam composition of Example 1 could be readily removed from this mold for at least eight cycles.

It has been determined that the amount of fluorocarbon silane on the mold surface to effectively achieve multiple release properties can be as low as about 0.2 mg./cm.$^2$. Such a concentration can be obtained for example by spraying the mold surface from a solution containing about 0.5 weight percent of fluorocarbon silane.

Although the invention has been illustratively described with particular reference to metal molds for use in the molding of foamed urethane articles, it is obvious that the invention will also be useful for molding solid, non-cellular articles. Thus, various alterations and modifications of the composition may be made and additional components may be used in the composition of the present invention, as will readily become apparent to those skilled in the art, without departing from the scope of the invention.

I claim:

1. A method for molding comprising charging a molding composition to a mold having adhered to its confining surface a multiple release coating of a polymer of a hydrolyzable trifunctional silane having the formula $R_fQ_pSiX_3$, in which $R_f$ is a fluorinated monovalent aliphatic terminal radical of at least two carbon atoms containing only fluorine, hydrogen and chlorine substituent atoms, said radical containing a perfluoromethyl group and having not more than one substituent atom other than fluorine for every carbon atom in excess of two and each carbon atom bearing at least one fluorine atom; $Q_p$, where $p$ is 0 or 1, is a divalent linking radical —SO$_2$N(R)(C$_m$H$_{2m}$)— or —CON(R)(C$_m$H$_{2m}$)— in which R is hydrogen or a lower alkyl radical containing 1–4 carbon atoms and $m$ is 1–11, or —(C$_n$H$_{2n}$)—, where $n$ is 1–11 or —CH$_2$CHCl(C$_y$H$_{2y}$)— where $y$ is 0–9; and X is a hydrolyzable radical Cl, Br, H or OR' in which R' is a lower alkyl radical containing 1–4 carbon atoms, said coating being tenaciously bonded to the confining surface of said mold, forming a unitary solid mass of said molding composition in said mold and removing essentially only the solidified unitary mass from said mold, and repeating the molding cycle with said mold.

2. A method according to claim 1 wherein the hydrolyzable silane is $C_8F_{17}SO_2N(C_2H_5)CH_2CH_2CH_2SiCl_3$.

3. A method according to claim 1 wherein the hydrolyzable silane is $C_8F_{17}CH_2CHClSiCl_3$.

4. A method according to claim 1 wherein the hydrolyzable silane is $$C_8F_{17}SO_2N(C_2H_5)CH_2CH_2CH_2Si(OCH_3)_3$$

and is dispersed in a mildly acidic aqueous medium, said mold surface being heated to a temperature of about 130° C. prior to the application of said solution thereto.

5. A mold capable of providing multiple release of articles therefrom having tenaciously adhered to its confining surface a three-dimensional crosslinked polymeric coating of a hydrolyzable tri-functional silane of the formula $R_fQ_pSiX_3$, in which $R_f$ is a fluorinated monovalent aliphatic terminal radical of at least two carbon atoms containing only fluorine, hydrogen and chlorine substituent atoms, said radical containing a perfluoromethyl group and having not more than one substituent atom other than fluorine for every carbon atom in excess of two and each carbon atom bearing at least one fluorine atom; $Q_p$, where $p$ is 0 or 1, is a divalent linking radical —SO$_2$N(R)(C$_m$H$_{2m}$)— or —CON(R)(C$_m$H$_{2m}$)—, in which R is hydrogen or a lower alkyl radical containing 1–4 carbon atoms and $m$ is 1–11, or —(C$_n$H$_{2n}$)—, where $n$ is 1–11 or —CH$_2$CHCl(C$_y$H$_{2y}$)—, where $y$ is 0–9; and X is a hydrolyzable radical Cl, Br, H or OR' in which R' is a lower alkyl radical containing 1–4 carbon atoms.

References Cited

UNITED STATES PATENTS 3,012,006   12/1961   Holbrook et al. ____ 260—448.2

ROBERT F. WHITE, Primary Examiner

JEFFERY R. THURLOW, Assistant Examiner

U.S. Cl. X.R.

117—5.3; 249—115; 260—2.5, 46.5, 448.2; 264—45, 213, 216, 338